(12) United States Patent
Leuthold (10) Patent No.: US 9,163,925 B1
(45) Date of Patent: Oct. 20, 2015

(54) ELECTRIC FIELD MEASUREMENT APPARATUS

(75) Inventor: Hans L. Leuthold, Santa Cruz, CA (US)

(73) Assignee: Seagate Technology LLC, Cupertino, CA (US)

(*) Notice: Subject to any disclaimer, the term of this patent is extended or adjusted under 35 U.S.C. 154(b) by 933 days.

(21) Appl. No.: 13/363,713

(22) Filed: Feb. 1, 2012

(51) Int. Cl.
  *G01B 7/30* (2006.01)
  *G01B 7/14* (2006.01)
  *G11B 5/596* (2006.01)

(52) U.S. Cl.
  CPC .............. *G01B 7/14* (2013.01); *G11B 5/59627* (2013.01)

(58) Field of Classification Search
  None
  See application file for complete search history.

(56) References Cited

U.S. PATENT DOCUMENTS

| 4,074,184 A * | 2/1978 | Dechene et al. ............... 324/434 |
| 5,130,661 A * | 7/1992 | Beck et al. ..................... 324/663 |
| 6,170,162 B1 | 1/2001 | Jacobsen et al. |
| 7,046,477 B2 | 5/2006 | Shibata |
| 7,633,705 B2 | 12/2009 | Sudo |
| 2005/0094523 A1 | 5/2005 | Wu |
| 2011/0141617 A1 | 6/2011 | Sudo |

* cited by examiner

*Primary Examiner* — Melissa Koval
*Assistant Examiner* — Stephen G Armstrong (57) ABSTRACT

A charge coupled displacement sensor includes a first number of electrodes disposed to form a first ring including a first diameter and further operable to form an electric field around an object. A second number of electrodes are alternately disposed with the first number of electrodes within the first ring and are further operable to measure variations in the electric field attributed to a position of the object. A third number of electrodes are disposed to form a second ring including a second diameter greater than the first diameter and further electrically coupled with an electrical ground.

18 Claims, 9 Drawing Sheets

ELECTRIC FIELD MEASUREMENT APPARATUS

FIELD

Embodiments according to the present invention generally relate to rotating bodies and measurement devices.

BACKGROUND

The background of this invention is the domain of dimensional measurement, inspection, and position control. More specifically, the determination of the shape of a rotating body as well as the location of its spin axis is measured.

One application may described as follows: In magnetic recording media, for example as used in hard disk storage devices, information is written to and read from magnetic elements that represent digital bits. In order to increase the amount of information that can be stored within a given area, the size and distance between these magnetic elements may be reduced so that they may be more densely positioned. At the same time, in order to increase production volume and decrease production cost, the speed at which disks are written to and read from when preparing the disks for use by an end-user may be increased. For example, a disk format operation may be performed on one or more disks during the manufacturing process in preparation for use by an end-user. In any case, accurate information of location as a function of time of the spin axis of the disks is useful.

One way to increase disk production volume and decrease production cost is by increasing the speed at which the disks rotate so that more magnetic elements may be accessed within a certain amount of time, thereby yielding more completed disks within the same amount of time. Another way to increase disk production volume and decrease production costs is by performing the same operations on more disks simultaneously, thereby requiring less manufacturing equipment.

However, both of these methods require more energy, which in turn increases the noise and vibration in the disks' environment. The interferences caused by rapid disk rotation and other interferences may cause random radial displacement or eccentricity of the rotating disk, resulting in non-repetitive run-out. As a result, in combination with the increasingly small size and proximate positions of the magnetic elements, the non-repetitive run-out may interfere with the accurate writing and reading of information stored on the disks, during their various manufacturing phases.

BRIEF DESCRIPTION OF THE DRAWINGS

Embodiments of the present invention are illustrated by way of example, and not by way of limitation, in the figures of the accompanying drawings.

DETAILED DESCRIPTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments of the present invention provide measurement methods and systems for determining the displacement or run-out of a rotating disk, for example, hard disks that store data. However, embodiments of the present invention can be applied to any rotating object to determine rotational displacement. Embodiments of the present invention allow for the determination of the amplitude, frequency, and phase of the correlated or non-correlated displacement of a rotating disk.

Other examples illustrating the background of this invention might be found in rotating machinery, such as lathes or CNC machining centers used for the manufacturing of mechanical parts. Yet another range of applications might be found in the control of spinning mirrors used in laser scanners of cash registers and such, or with the control of electromagnetic bearings of fast spinning cryogenic pumps.

A rotating disk may include both repetitive (correlated) run-out and non-repetitive (uncorrelated) run-out. For example, non-repetitive run-out of the disk may be caused by random vibrations or other types of random disturbances in the environment. At the same time, repetitive run-out of the disk may be caused by the imbalance of a disk stack if the disk is included in a stack of disks. In various embodiments, an electric field may be formed around the disk, or the body holding a stack of disks, by displacement sensors. For example, biasing electrodes may be biased to form an electric field. Floating electrodes may then be used to measure changes in the electric field due to a displacement of the disk to determine the repetitive run-out and non-repetitive run-out of the rotating disk.

The non-repetitive run-out of the disk may be orders of magnitude less than the repetitive run-out. For at least this reason, the signal corresponding to the non-repetitive run-out may be weak compared to the signal of the repetitive run-out. Moreover, due to the possible non-ideal positioning or structure of a printed circuit board (PCB) near the rotating disk or displacement sensors, additional noise may be introduced to the overall signal. Such noise from a PCB and its elements will be repetitive noise because the noise corresponding to each position of the electric field will be known and thereby non-random. As a result of both the repetitive and non-repetitive run-out, the signal-to-noise ratio (SNR) of the non-repetitive run-out to the repetitive run-out may be low.

Embodiments of the present invention allow for both the measurement of a rotating disk's repetitive run-out and non-repetitive run-out (NRRO). To determine the non-repetitive run-out of the disk, an electric field may be formed around the disk and measurements of the changes in the electric field due to displacement of the disk may be oversampled to increase the SNR.

Oversampling is the process of sampling a signal with a sampling frequency that is equal to or greater than the Nyquist rate, or twice the highest frequency of the signal being sampled. For example, the signal measured by the floating electrodes may be sampled at a frequency that is equal to or greater than twice the highest frequency of the non-repetitive run-out. To decrease the noise and increase the sampling resolution of the signal, a higher sampling frequency may be used. For example, when the sampling frequency is doubled, the sampling resolution is doubled, which results in half the noise after the signal is averaged or filtered down to the required rate.

Embodiments of the present invention include oversampling a signal that corresponds to each position of a plurality of positions of the electric field to determine the non-repetitive run-out component of the signal. For example, a first sample of the electric field's polarity and amplitude may be measured at a first position of the field and stored. The electric field may then be rotated to the next position where the next sample of the electric field's polarity and amplitude may be measured and stored. In this manner, the electric field may be rapidly stepped through a full revolution, e.g., 360 degrees, while the electric field's polarity and amplitude are measured and stored at each rotational position.

Once the electric field has completed a first full revolution, a second sample of the electric field's polarity and amplitude may be measured at the first position of the field. The average value of the previous and current samples of the electric field in each position may be stored. Accordingly, in the foregoing example, the average value of the first and second sample is stored in place of the value of the first sample. The electric field may then continue to rotate to complete a second full revolution while measurements of the electric field at each position are averaged or integrated with the previous measurement for each corresponding position, respectively.

Again, once the electric field has completed a second full revolution, a third sample of the electric field's polarity and amplitude may be measured at the first position of the field. The third sample may be averaged with the previously stored value, namely, the average of the first and second sample.

As the electric field completes additional rotations, the samples for each additional rotation may be averaged with the stored samples that correspond to each position of the electric field. As the stored values for each position continue to be integrated with sample values from additional positions, the repetitive noise may be determined with more accuracy. Once the repetitive noise has been determined, the repetitive noise can then be subtracted from the signal and the remaining signal may reveal the non-repetitive run-out component of the signal.

In various embodiments, the sampling frequency may be increased beyond twice the highest frequency of the signal being sampled. For example, if the typical amplitude of the repetitive run-out is 1,000 times greater than the typical amplitude of the non-repetitive run-out, the signal may be oversampled 1,000 times more. In some embodiments, the more than one sample may be taken at each position of the electric field before the electric field rotates to the next position. For example, if the electric field rotates at 25 MHz, samples may be taken at 100 MHz so that four samples are taken at each position of the electric field.

In various embodiments, the dominant disk mode may have a non-repetitive run-out with a bandwidth of 2 kHz. If an 8-bit angular resolver is used (allowing for 256 sample points), and if the disk spins at 12,000 rpm (or 200 Hz), then the run-out samples may pass at a frequency of 256×200 Hz, or roughly 50 kHz. If the max typical repetitive run-out is of the order of $1\times10^{-3}$ inch and the non-repetitive run-out is of the order of $1\times10^{-6}$ inch, then the non-repetitive run-out is a factor of 1,000 smaller than the repetitive run-out. As a result, 1,000 samples may be taken at a rate of 4 per rotation at 200 Hz to filter the measurements of run-out to determine the non-repetitive run-out component of the measurements. Accordingly, the electric field will rotate at a rate of 800 kHz or 16 samples for every click of a register storing values corresponding to run-out. Further, there may be at least one full revolution of the electric field, e.g. 32 positions, for every one of the 16 samples collected. As a result, a basic clock rate of 32×800 kHz, or 25.6 MHz, may be used.

Figure 1:
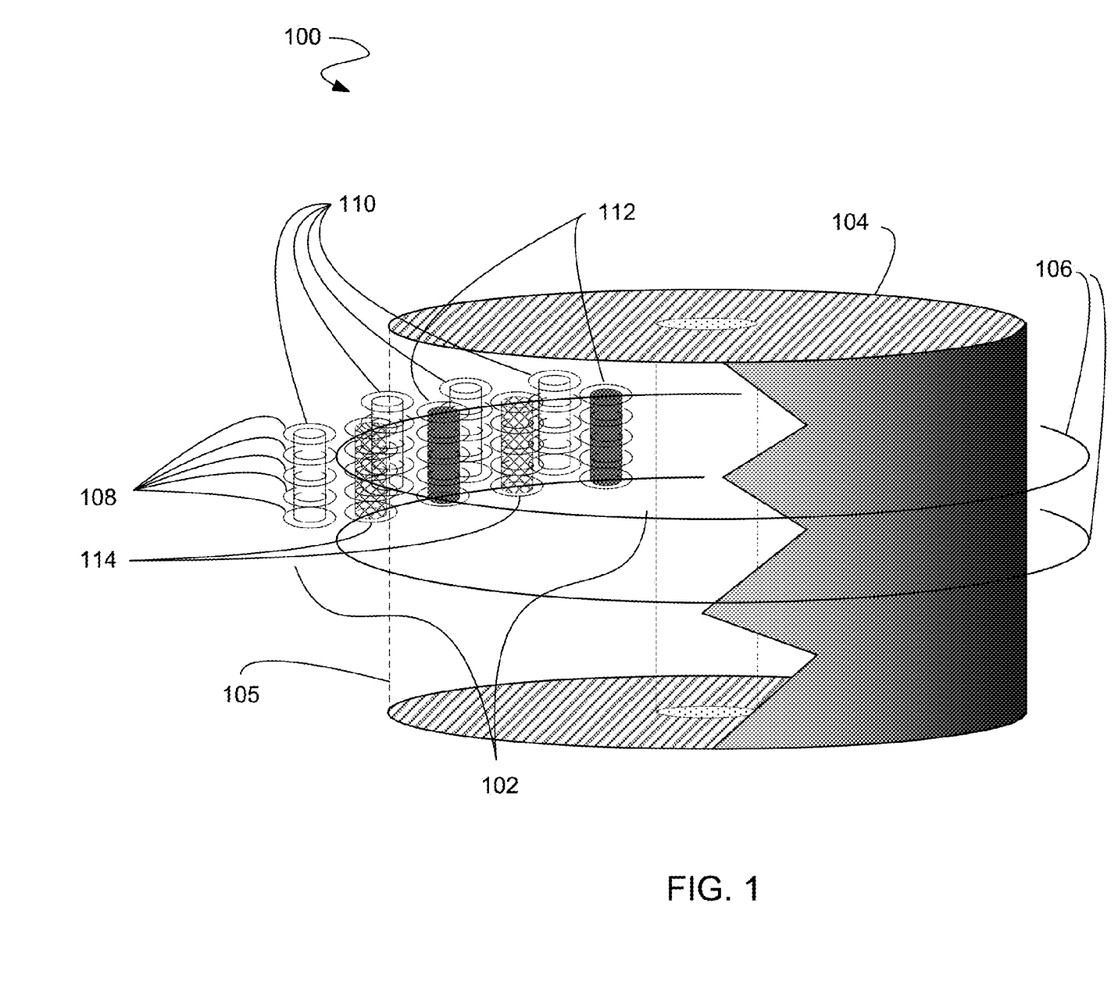
FIG. 1 is a side view of displacement sensor elements adjacent to a rotating body, according to an embodiment of the present invention.

FIG. 1 is a side view of electrodes 102 adjacent to a rotating disk 104, according to an embodiment of the present invention. In an embodiment, the electrodes 102 may constitute elements of a displacement sensor. In various embodiments, the electrodes 102 may be generally positioned on the outside edge 105 of the disk 104 and on the same radial plane as the rotation of the disk 104. For example, with reference to the disk's 104 rotation, the electrodes 102 may follow the trajectory 106 shown in FIG. 1.

Figure 2:
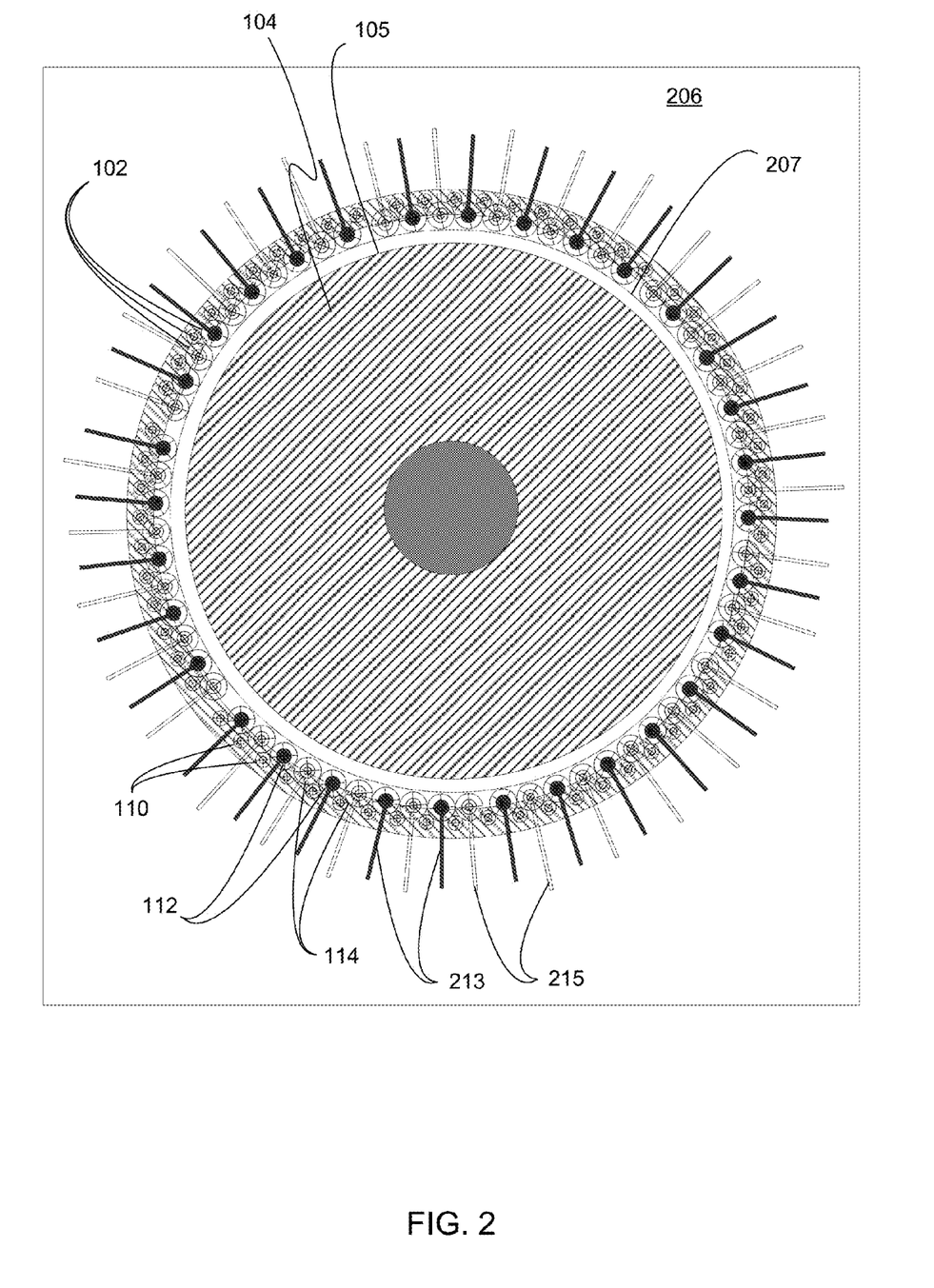
FIG. 2 is a plan view of displacement sensor elements adjacent to a rotating body, according to an embodiment of the present invention.

In some embodiments, the rotating disk 104 may be radially surrounded or framed by the electrodes 102. For example, more electrodes 102 may continue to be located along or outside the trajectory lines 106. In various embodiments, the electrodes 102 may be formed by or inside vias located inside a printed circuit board (PCB) that radially surrounds the disk 104 (FIG. 2). The vias may be used as biasing, floating, or sensing electrodes. The PCB may include one or more layers. For example, each via may include five pads 108 that correspond to five PCB layers.

The electrodes 102 include grounding electrodes 110, floating electrodes 112, and biasing electrodes 114. The grounding electrodes 110 may form an outer ring that is concentric with and outside the disk 104. The floating electrodes 110 and biasing electrodes 114 may form an inner ring that is also concentric with and outside the disk 104 but is inside the outer ring formed by the grounding electrodes 110. In an embodiment, the electrodes that form the outer ring or the inner ring may be distributed evenly so that each electrode is equidistant from adjacent electrodes. For example, the grounding electrodes 110 may be distributed in a pitched fashion along the outer ring. In further embodiments, the floating electrodes 112 and biasing electrodes 114 may be distributed in an alternating fashion along the inner ring.

FIG. 2 is a plan view of electrodes 102 adjacent to a rotating disk 104, according to an embodiment of the present invention. In an embodiment, the rotating disk 104 may be radially surrounded by a PCB 206 in which the electrodes 102 are located. However, embodiments of the present invention may be applied without the existence of a PCB and where the electrodes 102 are not formed by or inside vias, for example, where the electrodes 102 are simply electrodes. The rotating disk 104 includes an outer edge 105 and the PCB 206 includes an inner edge 207 that is concentric with and larger than the outer edge 105 of the disk 104.

While FIG. 2 labels only three electrodes 102, it can be appreciated that the three displacement sensor elements may be a subset of a larger number of electrodes 102 as illustrated in FIG. 2. For example, the electrodes 102 may include the electrodes 110, 112, and 114.

The electrodes 102 of FIG. 2 correspond to the electrodes 102 of FIG. 1. For example, as shown in FIG. 1, an outer ring of electrodes 102 in FIG. 2 that surround the rotating disk 104 may be formed by the grounding electrodes 110 while an inner ring may be formed by floating electrodes 112 and biasing electrodes 114, where the floating electrodes 112 and biasing electrodes 114 are arranged in an alternating fashion.

In one embodiment, there may be an even number of floating electrodes 112 and an even number of biasing electrodes 114. In various embodiments, the number of floating electrodes 112 may be equal to the number of biasing electrodes 114. For example, the electrodes 102 may include 32 floating electrodes 112 and 32 biasing electrodes 114. In some embodiments, the total number of floating electrodes 112 and biasing electrodes 114 may be equal to the number of grounding electrodes 110. For example, the displacement sensor elements may include 64 grounding electrodes 110 and 64 total floating electrodes 112 and biasing electrodes 114.

Floating traces 213 may couple floating electrodes 112 to sensing circuitry (not shown), while biasing traces 215 may couple biasing electrodes 114 to biasing circuitry (not shown). The sensing circuitry may be used to measure the voltage level of the floating electrodes 112 while the biasing circuitry may set the voltage levels of the biasing electrodes 114.

Figure 3A:
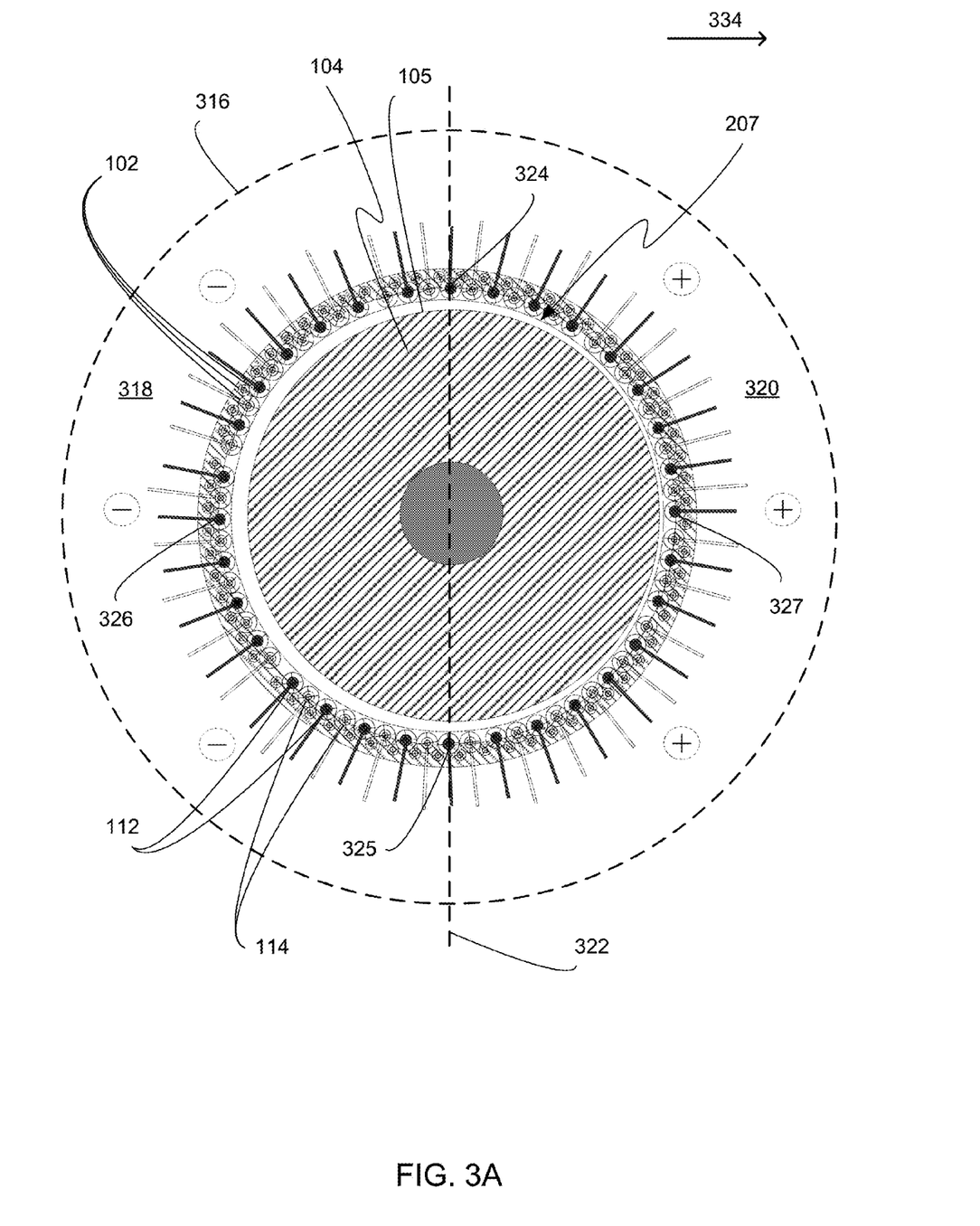
FIG. 3A depicts an electric field created by displacement sensors, according to an embodiment of the present invention.

FIG. 3A depicts an electric field 316 created by the electrodes 114, according to an embodiment of the present invention. The ring of biasing electrodes 114 is divided into two circular halves where half of the biasing electrodes 114 are biased with a negative voltage while the other half of the biasing electrodes 114 are biased with a positive voltage. As a result, an electric field is created with a negatively-charged region 318 and a positively-charged region 320. A meridian line 322 depicts the interface between the negatively-charged region 318 and the positively-charged region 320.

If the disk 104 is centered with respect to the inner edge 207 of the PCB 206 (FIG. 2), the floating electrodes 324 and 325 that fall on the meridian line 322 may measure a net potential equal to zero since such electrodes are positioned between two fields of equal strength, namely the negatively-charged region 318 and positively-charged region 320. At the same time, the floating electrodes 326 and 327 that are positioned farthest from the meridian line 322 may measure a net potential equal to $-V_{center}$ and $+V_{center}$, respectively, since such electrodes are positioned within one side of the electric field 316 and far away from the opposite side of the electric field 316.

However, if the disk 104 is displaced from a center position such that the distance between the outer edge 105 of the disk 104 and the inner edge 207 of the PCB 206 (FIG. 2) is not constant at all points around the circular edges, the floating electrodes 324, 325, 326, and 327, may contemporaneously measure voltages that are different from the voltages measured when the disk 104 is centered.

For example, the disk 104 may be displaced in the direction 334. The floating electrodes 112 may measure a difference in voltage since the displacement 334 of the disk affects the strength of the electric field 316 at the location of each of the floating electrodes 112. More specifically, the dielectric properties of the disk's 104 material will be different from the dielectric properties of the matter that exists between the outer edge 105 of the disk 104 and the inner edge 207 of the PCB. As the disk 104 nears or evacuates an area, the area's dielectric properties will change, which in turn will affect the strength and coverage of the electric field 316.

Since the displacement of the disk 104 is in a direction 334 that is lateral to and not directly toward either of the floating electrodes 324 and 325, those electrodes will measure only a slight change in the strength of the electric field 316 in their location. However, the floating electrodes 326 and 327 that are located farthest from the meridian line 322 will not only measure a net potential different from $-V_{center}$ and $+V_{center}$, respectively, but the difference measured will be larger than the difference measured by the floating electrodes 324 and 325.

Thus, the disk 104 has moved away from floating electrode 326 and closer to floating electrode 327, thereby increasing the distance between the outer edge 105 of the disk 104 and the inner edge 207 of the PCB 206 (FIG. 2) at the point nearest floating electrode 326, and at the same time decreasing the distance between the outer edge 105 of the disk 104 and the inner edge 207 of the PCB 206 (FIG. 2) at the point nearest floating electrode 327. As a result of the displacement, the fraction of the potential $-V_{center}$ or voltage (e.g., electric charge) measured by floating electrode 326 may be less than the fraction of the potential $+V_{center}$ or voltage measured by the floating electrode 327.

Since the disk 104 has moved in a direction directly away from floating electrode 326 and directly toward floating electrode 327, the change in the amount of voltage that may be measured by floating electrodes 326 and 327 will be greater than the change measured by floating electrodes 324 and 325.

By measuring the change in voltage (e.g., electric charge) of the floating electrodes, the amount of disk displacement may be determined. For instance, in the orientation of the electric field 316, the voltage measurements of the floating electrodes 326 and 327 may be used to determine the displacement of the disk 104. Based on the amplitude and polarity of the measurement, the amount and direction of disk displacement may be determined. For example, the larger the voltage measurement sampled by the floating electrodes, the more the disk has displaced.

In various embodiments, only the voltage (e.g., electric charge) measured by a subset of the floating electrodes 112 may be used to determine the strength of the electric field 316. For example, only the floating electrodes that are farthest from the meridian line 322 may be used. For instance, in the orientation of the electric field 316 depicted in FIG. 3A, the voltage measurements of only floating electrodes 326 and 327 may be used. In other embodiments, the floating electrodes 112 are electrically coupled so that the measurement of every floating electrode 112 will contribute to a net measurement of the electric field 316. The change in the amount of voltage that is measured will vary depending on the amount of disk displacement.

Figure 3B:
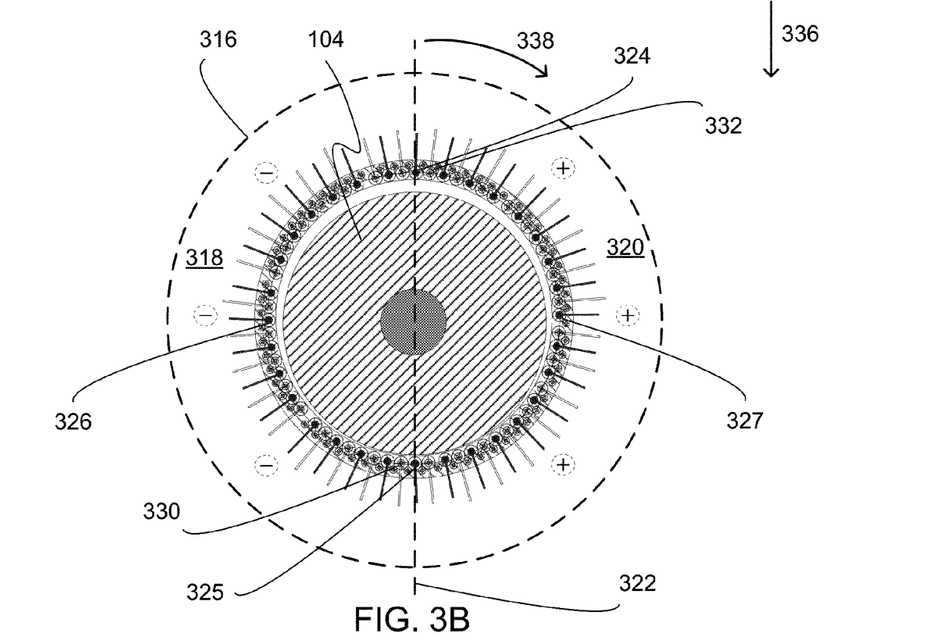
FIGS. 3B, 3C, 3D, and 3E depict the rotation of an electric field created by displacement sensors, according to an embodiment of the present invention.

FIG. 3B depicts the rotation 338 of an electric field 316 created by displacement sensors, according to an embodiment of the present invention. Similar to the electric field 316 of FIG. 3A, the biasing electrodes located to the left of the meridian line 322 are biased to a negative voltage, thereby creating the negatively-charged region 318. Accordingly, biasing electrode 330 that is positioned within the negatively-charged region 318 is biased to a negative voltage.

Similarly, the biasing electrodes located to the right of the meridian line 322 are biased to a positive voltage, thereby creating the positively-charged region 320. Accordingly, biasing electrode 332 that is positioned within the positively-charged region 320 is biased to a positive voltage. The difference in voltage between the biasing electrodes positioned within the negatively-charged region 318 and positively-charged region 320 creates the electric field 316 in an initial orientation of the electric field 316.

Unlike FIG. 3A, if the disk 104 moves away from floating electrode 324 and toward floating electrode 325 in a downward direction 336, the electric field at floating electrodes 326 and 327 may be only slightly affected since the movement of the disk 104 would be lateral to those electrodes. As a result, floating electrodes 326 and 327 may measure only a slight change of the fraction of the potential difference between $+V_{center}$ and $-V_{center}$.

At the same time, floating electrodes 324 and 325 may also measure only a slight change in voltage since half of the disk 104 is still in the negatively-charged region 318 and the other half of the disk 104 is still in the positively-charged region 320. Accordingly, the measurement of changes in the electric field 316 on the floating electrodes 112 may be less when the disk 104 moves in a direction along the meridian line 322 of the electric field 316. Therefore in order to increase the change in potential measured by the electrodes, the orientation of the electric field 316 may be adjusted such that it rotates in the direction indicated by the arrow 338.

Figure 3C:
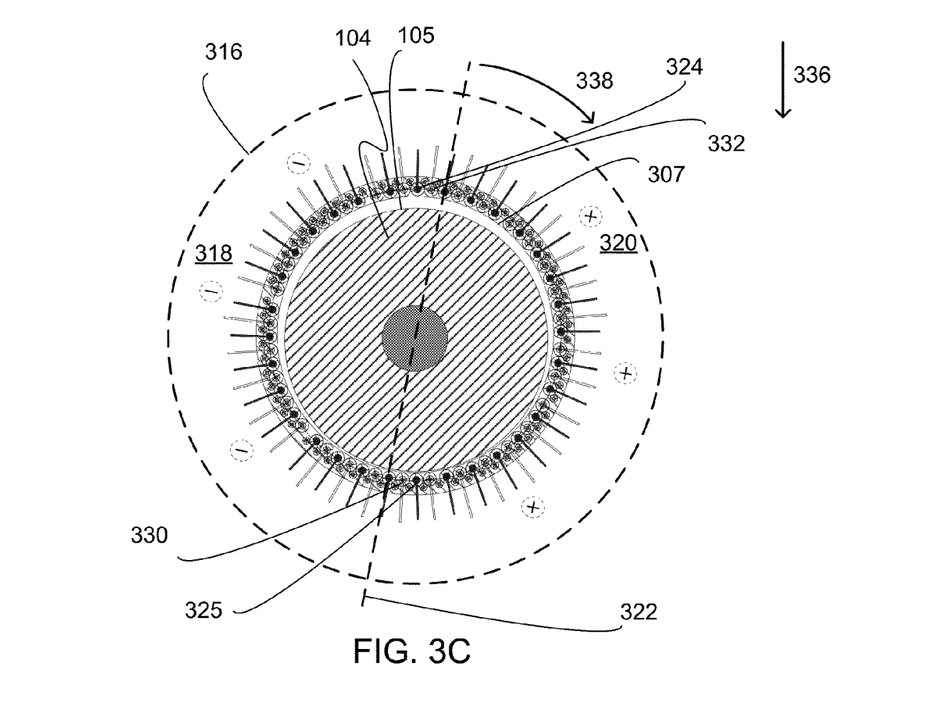

FIG. 3C depicts the rapid rotation 338 of an electric field 316 created by displacement sensors, according to an embodiment of the present invention. Similar to the electric field 316 of FIG. 3A, the biasing electrodes positioned to the left of the meridian line 322 and within the negatively-charged region 318 are biased to a negative voltage. At the same time, the biasing electrodes positioned to the right of the meridian line 322 and within the positively-charged region 320 are biased to a positive voltage.

However, the driving protocol arrangement of negatively and positively biased biasing electrodes causes the electric field 316 to rotate in a clockwise manner. More specifically, biasing electrode 330, which was originally biased to a negative voltage, may be now biased to a positive voltage. Similarly, biasing electrode 332, which was originally biased to a positive voltage, may be now biased to a negative voltage. Meanwhile, the voltage of all of the other biasing electrodes may be maintained.

As a result of the new driving state of negatively and positively biased biasing electrodes, the electric field 316 rotates, e.g. in a clockwise manner. As the electric field 316 rotates, the weakest areas of electric field measurement, e.g. near the meridian line 322, rotate away from the areas where the outer edge 105 of the disk 104 is nearest or farthest from the inner edge 207 of the PCB 206. Correspondingly, the strongest areas of electric field measurement, e.g. the areas on the ring of electrodes farthest from the meridian line 322, rotate toward the areas where the outer edge 105 of the disk is nearest or farthest from the inner edge 207 of the PCB 206. As a result, the floating electrodes that may have been positioned in the weakest areas of electric field measurement may eventually be positioned in the strongest area of electric field measurement, which in turn increases the floating electrodes' measurement of the changes in the electric field 316 caused by the displacement 336.

For example, the floating electrodes 324 and 325 in FIG. 3B were least sensitive to the changes in the electric field 316 caused by the displacement 336 since they were positioned on the meridian line 322, where electric field measurement may be weakest. However, as the electric field 316 rotates in the direction indicated by the arrow 338, the floating electrodes 324 and 325 become more sensitive to the changes in the electric field 316 caused by the displacement of the disk 336 since the effect of the displacement 336 on the strength of electric field measurement is increased when the floating electrodes 324 and 325 are positioned in the strongest areas of electric field measurement.

As a result of the rotation of the electric field 316, the floating electrodes that are best positioned to measure changes in the electric field 316 due to the disk displacement will eventually be located in the strongest areas of electric field measurement. Once the strength of the electric field 316 in each rotational position is known, both the amount and direction of the disk displacement may be determined.

Figure 3D:
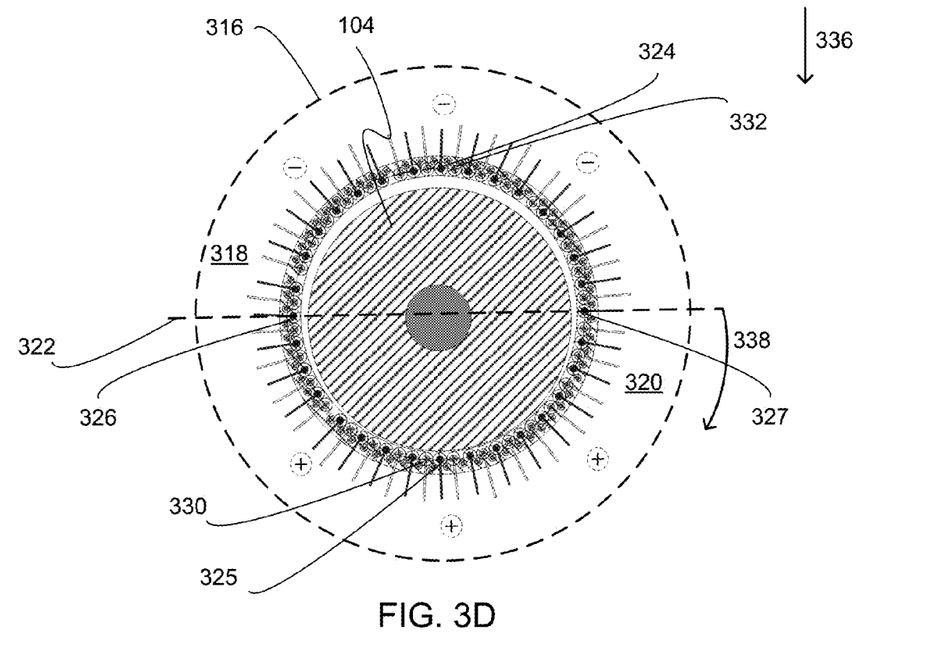

FIG. 3D depicts the rotation 338 of an electric field 316 created by displacement sensors, according to an embodiment of the present invention. The electric field 316 of FIGS. 3A-3C may be caused to continue to rotate when the biasing of the biasing electrodes that are immediately adjacent to the direction of the meridian line's rotation are changed from positive to negative and from negative to positive in the fashion described above with reference to FIG. 3C. The electric field 316 depicted in FIG. 3D has completed a quarter-rotation through this manner.

Like FIGS. 3B-3C, the disk 104 is displaced from a center position since it has moved away from floating electrode 324 and toward floating electrode 325 in the direction 336. Unlike FIGS. 3B-3C, the floating electrodes 324 and 325 in FIG. 3D are positioned where electric field measurement may be strongest. As a result, floating electrodes 324 and 325 are most sensitive to changes in the electric field 316 caused by the displacement 336.

Since the floating electrodes 324 and 325 measure the largest amount of change in the electric field 316 in comparison to all of the other floating electrodes in every other rotational position of the electric field 316, it can be determined that the disk 104 has displaced in the displacement direction 336. In addition, the amplitude of the change in the electric field 316 may be used to determine the amount of disk displacement in the displacement direction 336. In this way, the direction and amplitude of the disk's 104 displacement in any direction may be determined by rotating the electric field 316 360 degrees and determining at which position the measured change of the electric field 316 is greatest.

Figure 3E:
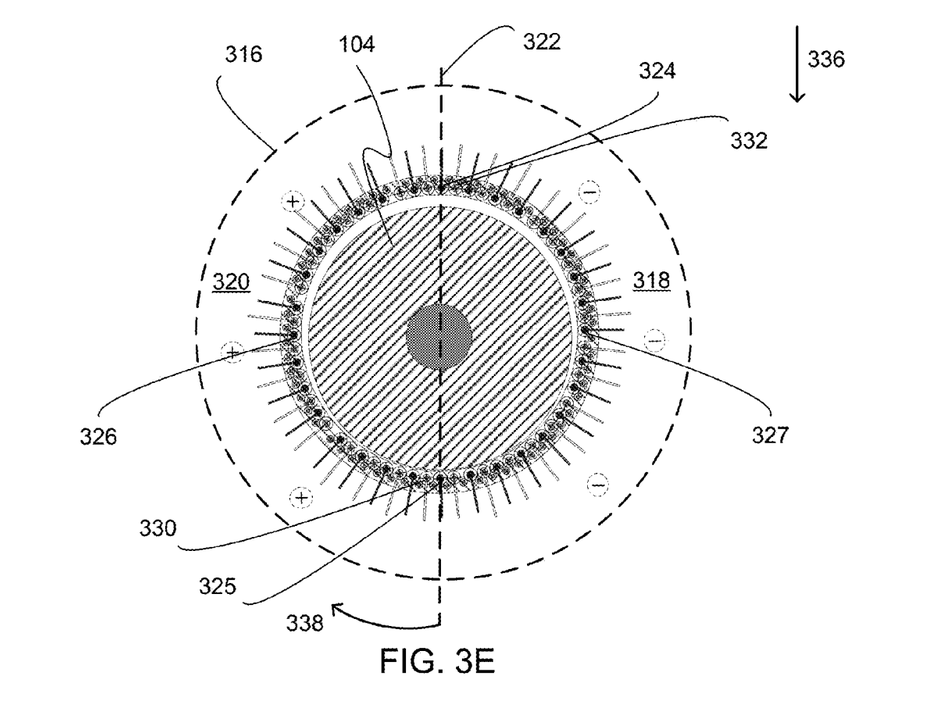

FIG. 3E depicts the rotation 338 of an electric field 316 created by displacement sensors, according to an embodiment of the present invention. In The electric field 316 in FIG. 3E has rotated 180 degrees in comparison to its position in FIG. 3A. Once the electric field 316 has completed such a half-rotation, the measurements made by the floating electrodes may be sufficient to determine the displacement of the disk 104. For example, not only may have the floating electrodes forming the half-ring below floating electrodes 326 and 327 taken measurements, but the floating electrodes forming the half-ring above floating electrodes 326 and 327 may have taken measurements as well. As a result, the displacement 336 of the disk may have been measured by all 32 floating electrodes positioned around the disk 104.

As the biasing electrodes continue to change in their biasing arrangement, the electric field 316 will eventually complete a full rotation. Accordingly, biasing electrodes 330 and 332 will once again be biased to negative and positive potentials, respectively. After one full rotation of the electric field 316, the floating electrodes 112 will have made 32 measurements. Using the 32 measurements, the displacement of the disk may be determined. However, embodiments of the present invention can be applied where there are more or less floating electrodes and biasing electrodes, resulting in more or less displacement measurements per each electric field rotation. For example, to increase the accuracy of the displacement measurement, 64 floating electrodes and 64 biasing electrodes may be used to produce 64 measurements.

Conversely, when less accuracy is sufficient, 16 floating electrodes and 16 biasing electrodes may be used to produce 16 measurements. Even as few as 4 floating electrodes and 4 biasing electrodes, located above, below, to the right, and to the left of the disk, may be used to produce a rotating field that has 4 electric field rotational positions that may be used to measure the displacement of the disk. Even further, in such a configuration, the field may be rotated to only 2 positions. For example, the field may be rotated once to the orientation depicted in FIG. 3B and once to the orientation depicted in FIG. 3D. Since the floating electrodes may measure the X and Y displacement components of the disk, the overall displacement of the disk in any direction of the 2-dimensional radial plane may be determined.

In various embodiments, not all possible positions of the electric field may be used. For example, if there are 32 biasing electrodes, only 16 of the biasing electrodes may be used, resulting in only 16 electric field positions. As discussed above, even as few as 4 floating electrodes and 4 biasing electrodes may be sufficient to measure the displacement of the disk in some embodiments. Accordingly, even where there are 32 floating electrodes and 32 biasing electrodes, only 4 floating electrodes and 4 biasing electrodes may be used to measure the displacement of the disk.

In some embodiments, the biasing electrodes may be grouped. For example, the biasing electrodes may be "doubled-up" so that each time the biasing electrode configuration is changed, two biasing electrodes are changed to a positive potential and two biasing electrodes are changed to a negative potential. As a result, if there are 32 biasing electrodes, there will be 16 electric field positions.

While embodiments of the invention have been discussed with the number of floating electrodes being equal to the number of biasing electrodes, there may be more or less floating electrodes than biasing electrodes. For example, while there may be 32 floating electrodes, 64 biasing electrodes may provide 64 electric field rotational positions. Conversely, while there may be 32 biasing electrodes, 64 floating electrodes may provide higher-resolution measurements of the electric field. In some embodiments, the size of the floating electrodes may differ from the size of the biasing electrodes, such that larger biasing electrodes would result in a stronger electric field or larger floating electrodes would result in increased sensitivity to the electric field.

Embodiments of the present invention can be applied where the rotation of the electric field 316 is either in a clockwise or counterclockwise direction. In further embodiments, the rotation of the electric field 316 may be either in the same or opposite direction as the rotation of the disk 104. In various embodiments, the electric field 316 may complete multiple rotations in the time that disk 104 completes a single rotation.

Figure 4A:
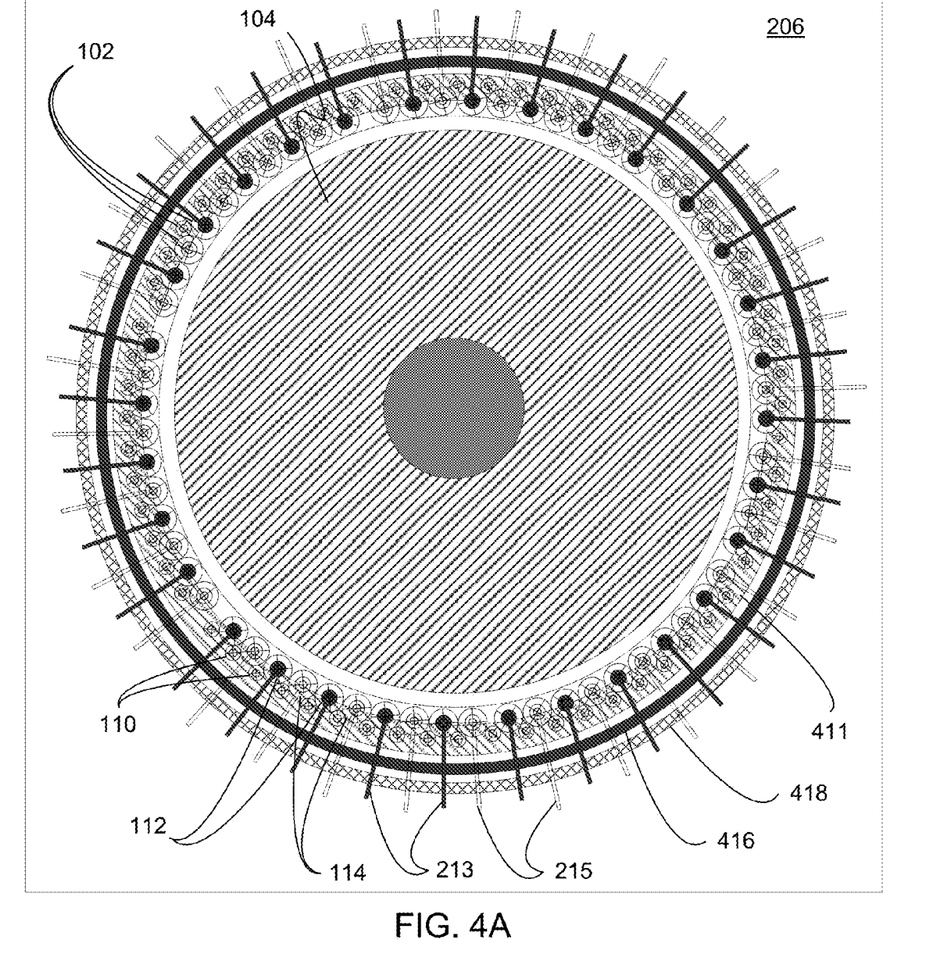
FIG. 4A is a plan view of a floating ring and a sensing ring plane, according to an embodiment of the present invention.

FIG. 4A is a plan view of a floating ring 416 and a first sensing ring 414 and a second sensing ring 418, according to an embodiment of the present invention. As discussed above with reference to FIG. 2, a PCB 206 with multiple layers may be used. For example, the PCB 206 may include 5 layers, where the top and first layer includes biasing traces 215 that couple biasing electrodes 114 with biasing circuitry (not shown). A second layer below the first layer may include a first sensing ring 414 (see FIG. 4B) and a grounding plane 411. The grounding plane 411 may insulate the electrodes, floating traces 213, floating ring 416, and sensing rings from each other and from the biasing traces such that the voltage or charge transfer due to the movement of the disk is measured accurately without interference from the biasing electrodes or other components. The grounding plane 411 may exist on all layers of the PCB 206.

A third layer below the second layer includes floating traces 213 that couple some or all of the floating electrodes 112 with a floating ring 416 (see FIG. 4B). Accordingly, some or all of the floating electrodes 112 may be coupled with each other through the floating traces 213. A fourth layer below the third layer may include a second sensing ring 418 (see FIG. 4B) and another grounding plane 411. Finally, a fifth layer below the fourth layer may include a grounding plane 411.

Figure 4B:
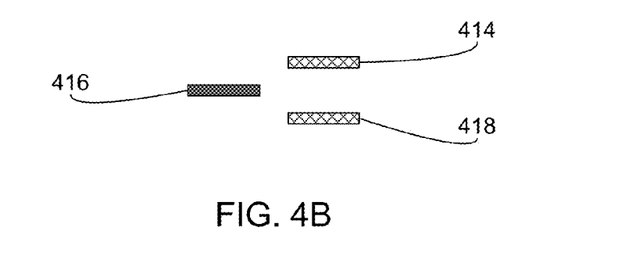
FIG. 4B is a cross sectional view of a floating ring and a sensing ring plane, according to an embodiment of the present invention.

Since the floating ring 416 (see FIG. 4B) is included in the third layer of the PCB 206, it is disposed between the first sensing ring 414 (see FIG. 4B) and the second sensing ring 418 (see FIG. 4B). FIG. 4B is a cross sectional view of the floating ring 416 and a sensing ring plane, according to an embodiment of the present invention. As illustrated by FIG. 4B, the floating ring 416 is disposed on a layer that is between the layer of the first sensing ring 414 and the layer of the second sensing ring 418.

Returning to FIG. 4A, the floating traces 213 on the third layer extend from the floating electrodes 112 to points that are either directly between the first sensing ring 414 and the second sensing ring 418 or to points that are radially passed the first sensing ring 414 and the second sensing ring 418. Accordingly, the floating traces 213 are disposed between two plates of a capacitor formed by the first and second sensing rings. As a result, the first sensing ring 414 and the second sensing ring 418 may be used to measure the changes in potential or charge transfers on the floating electrodes 112. The charge transfer occurs as an electrode switches from one potential to another, as discussed below. The net electric charge transferred is the product of the capacitor between a sensing electrode and a control electrode, times the difference in potential resulting from switching of those electrodes.

However, embodiments of the present invention may be applied where the interface between the floating and biasing electrodes is coupled to circuitry through other means. For example, the floating and sensing rings may not be used, but instead, the floating traces may couple directly with sensing circuitry (not shown). Further, embodiments of the present invention may be applied where the PCB includes more or less layers. For example, a PCB with 20 layers may be used.

Figure 5A:
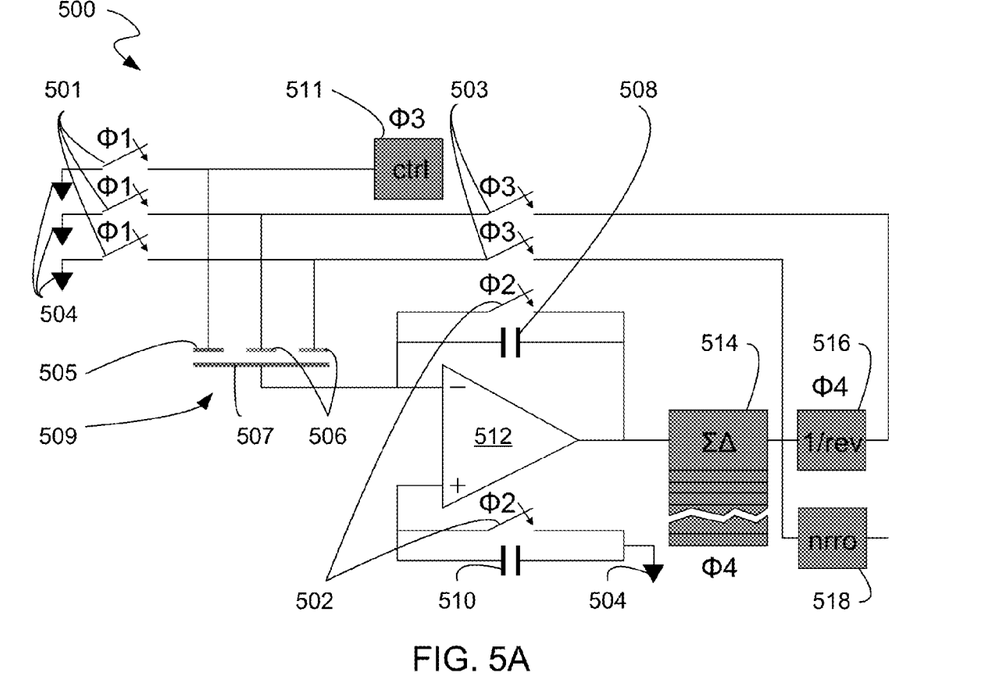
FIG. 5A is a schematic diagram of circuitry that determines the displacement of a rotating disk based on information provided by displacement sensors, according to an embodiment of the present invention.
Figure 5B:
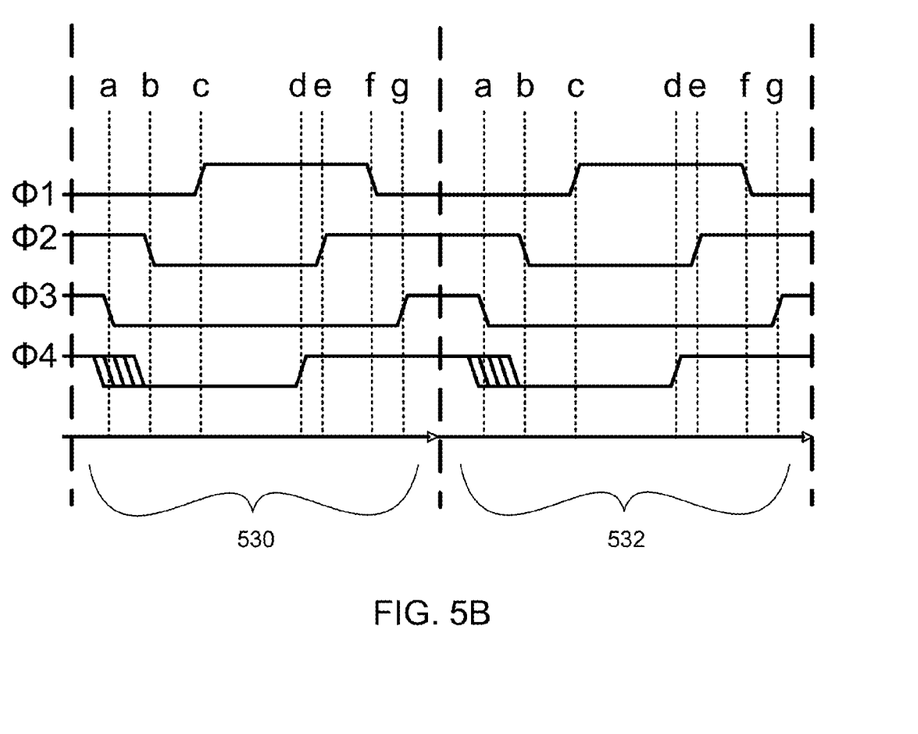
FIGS. 5B and 5C depict a circuit timing diagram of circuitry that determines the displacement of a rotating disk based on information provided by displacement sensors, according to an embodiment of the present invention.
Figure 5C:
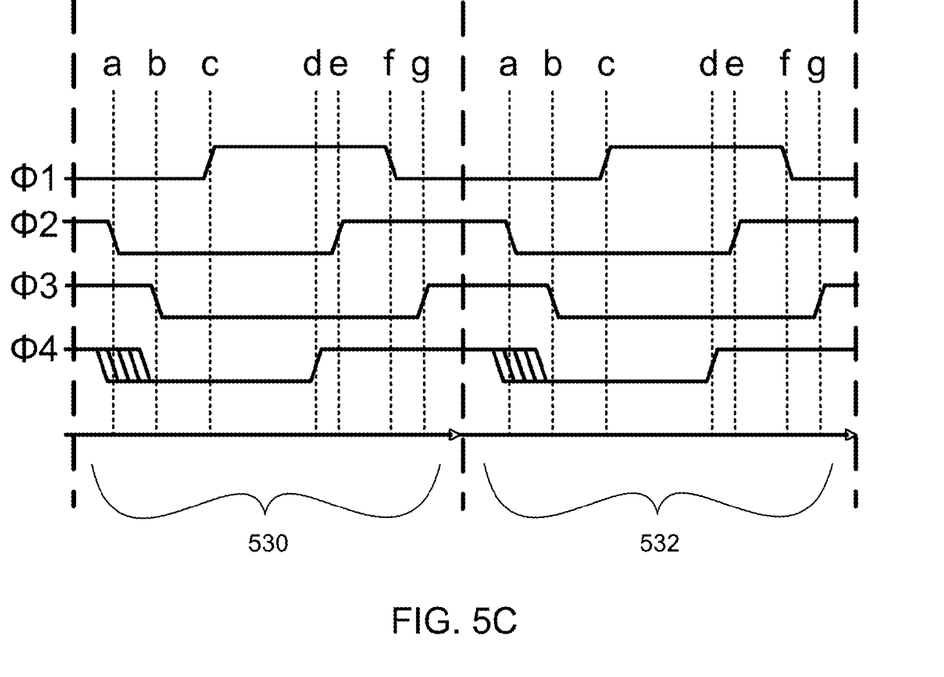

FIG. 5A is a schematic diagram of a circuit 500 that may be used to determine the displacement of a rotating disk based on information provided by displacement sensors, according to an embodiment of the present invention. FIGS. 5B and 5C depict a circuit timing diagram for the circuit 500 of FIG. 5A that determines the displacement of the rotating disk based on the information provided by the displacement sensors, according to an embodiment of the present invention. The schematic diagram of the circuit 500 in FIG. 5A will be discussed with reference to the circuit timing diagrams in FIGS. 5B and 5C.

FIGS. 5B and 5C show two full clock cycles 530 and 532 of a non-overlapping clock, where both cycles 530 and 532 follow the same timing pattern. For instance, clock signal φ4 may go high for each time labeled 'd' in both the clock cycles 530 and 532, clock signal φ2 may go high for each time labeled 'e' in both the clock cycles 530 and 532, and so on.

Circuit 500 includes electrical ground nodes 504 and switches 501, 502, and 503. When a clock signal goes high, the switch corresponding to that clock signal may close, i.e., shorting the connection. Conversely, when a clock signal goes low, the switch corresponding to that clock signal may open.

Circuit 500 also includes biasing electrodes 505 which may correspond to the biasing electrodes 114 of FIGS. 1-4. The sampling electrodes 506 may correspond to or may be coupled with the first sensing ring 414 and the second sensing ring 418 of FIGS. 1-4. The floating electrodes 507 may correspond to or may be coupled with the floating ring 416 of FIGS. 1-4. Accordingly, the capacitor 509 may correspond to the capacitor assembly formed between the first sensing ring 414, the second sensing ring 418, the biasing electrodes 505, and the floating electrodes 507. Additional capacitive components between each of the first sensing ring 414, the second sensing ring 418, the biasing electrodes 505, and the floating electrodes 507 are not shown for clarify of the figure.

In reference to FIG. 5B, one clock period may begin at time 'a' in clock cycle 530. At time 'a,' signal φ3 goes low, causing switches 503 to open. As a result, biasing electrodes 505 are caused to float. Approximately at the same time, signal φ4 goes low in preparation for its next rising edge. At time 'b,' signal φ2 goes low, causing the switches 502 to open. Consequently, the capacitors 508 and 510 are caused to float, allowing the capacitors 508 and 510 to sample the next electric field charge created by the biasing electrodes 505 and altered by the displacement of an object within the electric field.

At time 'c,' signal φ1 goes high, causing switches 501 to close. As a result, biasing electrodes 505 and sensing electrodes 506 are shorted to the ground nodes 504. At the same time, the bias is set, which results in a charge transfer across the floating capacitors 509, which is sampled by the capacitors 508 and 510.

At time 'd,' signal φ4 goes high, causing a sigma-delta converter 514 to acquire the sign of the resulting charge on an integrator 512 for further processing. In various embodiments, the integrator 512 may be an operational transconductance amplifier with input and output terminals linked by capacitors 508 and 510. The integrator 512 may integrate a previously stored value in the sigma-delta converter 514 with a currently measured value and store the integrated value in the sigma-delta converter 514. At time 'e,' signal φ2 goes high, causing the switches 502 to close. Accordingly, the charge levels on the sample and hold capacitors 508 and 510 are reset as a result of the short.

At time 'f,' signal φ1 goes low, causing the switches 501 to open, and at time 'g,' signal φ3 goes high, causing switches 503 to close. As a result, the biasing potentials on the biasing electrodes 505 and sensing electrodes 506 are set. At this time, the biasing electrodes 505 may be biased to rotate the electric field to the next electric field rotation.

When signal φ3 goes low once again at time 'a' in the next clock cycle 532, the switches 503 are caused to open. Accordingly, the biasing electrodes 505 float once again, which ends the previous clock cycle 530 and initiates the next clock cycle 532.

It should be appreciated that different timing diagrams may describe the operation of circuit 500. For example, in reference to FIG. 5C, one clock period may begin at time 'a' in clock cycle 530. At time 'a,' signal φ2 goes low, causing the switches 502 to open. Consequently, the capacitors 508 and 510 are caused to float, allowing the capacitors 508 and 510 to sample the next electric field charge created by the biasing electrodes 505 and altered by the displacement of an object within the electric field. At time 'b,' signal φ3 goes low, causing switches 503 to open. As a result, biasing electrodes 505 and sensing electrodes 506 are caused to float. Approximately at the same time, signal 14 goes low in preparation for its next rising edge.

At time 'c,' signal φ1 goes high, causing switches 501 to close. As a result, biasing electrodes 505 and sensing electrodes 506 are shorted to the ground nodes 504. This shorting to ground changes the potential of the biasing electrodes 505 and sensing electrodes 506, which results in a charge transfer across the floating capacitors 509, which is sampled by the capacitors 508 and 510.

At time 'd,' signal φ4 goes high, causing a sigma-delta converter 514 to acquire the sign of the resulting charge on an integrator 512 for further processing. In various embodiments, the integrator 512 may be an operational transconductance amplifier with input and output terminals linked by capacitors 508 and 510. The integrator 512 may integrate a previously stored value in the sigma-delta converter 514 with a currently measured value and store the integrated value in the sigma-delta converter 514. At time 'e,' signal φ2 goes high, causing the switches 502 to close. Accordingly, the charge levels on the sample and hold capacitors 508 and 510 are reset as a result of the short.

At time 'f,' signal φ1 goes low, causing the switches 501 to open, and at time 'g,' signal φ3 goes high, causing switches 503 to close. As a result, the biasing potentials on the biasing electrodes 505 and sensing electrodes 506 are set. At this time, the biasing electrodes 505 may be biased to rotate the electric field to the next electric field rotation.

When signal φ2 goes low once again at time 'a' in the next clock cycle 532, the switches 502 are caused to open. Accordingly, the capacitors 508 and 510 are caused to float once again, which ends the previous clock cycle 530 and initiates the next clock cycle 532.

In various embodiments, the circuit in FIG. 5A may be operated in accordance with a clock cycle of the timing diagrams in FIGS. 5B and 5C for each rotational position of the electric field. For example, 32 biasing electrodes 505 may create 32 electric field positions. For each electric field position, the circuit may complete one clock cycle. As a result, an electric field may be created for each of the 32 positions and the electric field may be sampled for each of the 32 positions.

In some embodiments, the sigma-delta converter 514 may include multiple registers to store a value corresponding to each position of the electric field. For example, if there are 32 electric field positions, the sigma-delta converter 514 may include 32 registers to store an electric field strength value that corresponds to each position. In various embodiments, when the electric field has completed one full revolution and begins a next revolution, the values in the sigma-delta converter may be overwritten by the average value of the previously stored measurement and the current measurement. As a result, the measurements of each position of an object may be oversampled.

Figure 6:
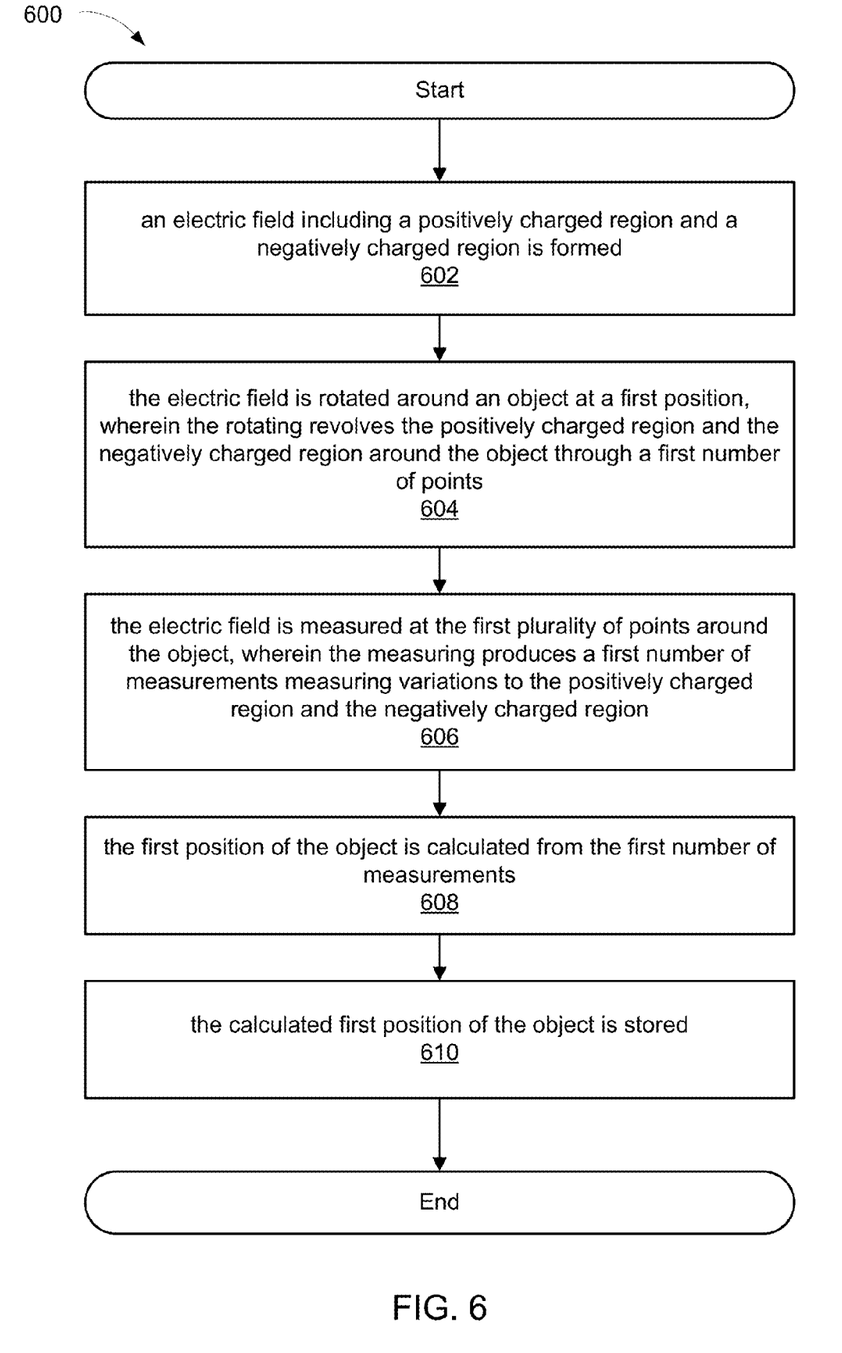
FIG. 6 depicts a flowchart 600 of an exemplary process of determining a displacement of an object, according to an embodiment of the present invention.

FIG. 6 depicts a flowchart 600 of an exemplary process of determining a displacement of an object, according to an embodiment of the present invention. In a block 602, an electric field including a positively charged region and a negatively charged region is formed. For example, in FIG.

3A, an electric field including a positively charged region and a negatively charged region is formed.

In various embodiments, forming an electric field includes biasing a first half of a ring of a number of biasing electrodes to a positive voltage to form the positively charged region and biasing a second half of the ring of the number of biasing electrodes to a negative voltage to form the negatively charged region. For example, in FIG. 3A, an electric field is formed by biasing a first half of a ring of a number of biasing electrodes to a positive voltage to form the positively charged region and biasing a second half of the ring of the number of biasing electrodes to a negative voltage to form the negatively charged region.

In various embodiments, a first number of electrodes are disposed to form a first ring, and further operable to form the electric field around the object. For example, in FIG. 3A, a number of biasing electrodes are disposed to form a first ring including a first diameter, and further operable to form the electric field around the object. In further embodiments, a second number of electrodes is alternately disposed with the first number of electrodes within the first ring, and further operable to measure variations in the electric field attributed to a position of the object. For example, a number of floating electrodes is alternately disposed with the number of biasing electrodes within the first ring, and further operable to measure variations in the electric field.

In even further embodiments, a third number of electrodes are disposed to form a second ring and further electrically coupled with an electrical ground. For example, in FIG. 2, a number of grounding electrodes are disposed to form a second ring including a second diameter greater than the first diameter, and further electrically coupled with an electrical ground plane.

In some embodiments, the first and second number of electrodes are disposed in vias formed in a printed circuit board. For example, in FIG. 2, the biasing electrodes and floating electrodes are disposed in vias formed in a printed circuit board.

In an embodiment, a number of biasing circuits are operable to bias the first number of electrodes to a number of voltage levels, wherein each of the biasing circuits are coupled with at least one of the first number of electrodes. For example, in FIG. 5A, the control block is coupled with at least one of the biasing electrodes and operable to bias biasing electrodes to a number of voltage levels.

In further embodiments, each of the second number of electrodes is electrically coupled with one another. For example, in FIG. 4, each of the number of floating electrodes is electrically coupled with one another through floating ring. In some embodiments, the first number of electrodes equals the second number of electrodes in number, and the third number of electrodes equals the sum of the number of the first and second number of electrodes. For example, in FIG. 4, the number of biasing electrodes equals the number of floating electrodes in number, and the number of ground electrodes equals the sum of the number of the biasing and floating number of electrodes.

In an embodiment, a number of floating traces are disposed on a floating trace plane, and each of the second number of electrodes is coupled with at least one floating trace. For example, in FIG. 4, the floating traces are disposed on a floating trace plane, and each of the number of floating electrodes is coupled with at least one floating trace.

In another embodiment, a first sensing ring and a second sensing ring are circular with a third diameter greater than the second diameter, the first sensing ring is disposed on a plane above the floating trace plane and above at least one floating trace, and the second sensing ring is disposed on a plane below the floating trace plane and below at least one floating trace. For example, in FIG. 4, a first sensing ring and a second sensing ring are circular with a third diameter greater than the second diameter, the first sensing ring is disposed on a plane above the floating trace plane and above at least one floating trace, and the second sensing ring is disposed on a plane below the floating trace plane and below at least one floating trace.

In a block 604, the electric field is rotated around an object at a first position, wherein the rotating revolves the positively charged region and the negatively charged region around the object through a first number of points. For example, in FIG. 3C, the electric field is rotated around an object at a first position, wherein the rotating revolves the positively charged region and the negatively charged region around the object through a first number of points along the rotational direction. In an embodiment, the rotating includes time altering a distribution of a number of electric charges on a number of biasing electrodes over the first plurality of points around the object. For example, in FIG. 3C, the distribution of a number of electric charges is time altered on the biasing electrodes, including biasing electrodes.

In a block 606, the electric field is measured at the first plurality of points around the object, wherein the measuring produces a first number of measurements measuring variations to the positively charged region and the negatively charged region. For example, in FIG. 3A, the floating electrodes measure the electric field at various points around the object to measure variations to the positively charged region and the negatively charged region.

In some embodiments, the measuring includes measuring the electric field with a number of floating electrodes. For example, in FIG. 3A, the floating electrodes measure the electric field at various points around the object to measure variations to the positively charged region and the negatively charged region.

In an embodiment, the first plurality of measurements is sampled around an approximately complete circumference of the object. For example, in FIG. 3A, the floating electrodes measure the electric field around the circumference of the object.

In a block 608, the first position of the object is calculated from the first number of measurements. For example, in FIG. 3A, the position of the object may be calculated from the first number of measurements taken by the floating electrodes.

In various embodiments, the electric field is measured at a second number of points around the object at a second position, wherein the measuring the electric field at the second number of points produces a second number of measurements, and the second position is calculated from the second number of measurements. For example, the second position may include when the electric field has rotated by one or more increments, as depicted in FIG. 3C. The second position may also include when the electric field has completed a full revolution and is again in the first position. In addition, the second position may include a second position of the object. The first and second number of measurements may be integrated to measure the electric field.

In some embodiments, the electric field is oversampled, wherein the oversampling includes taking measurements of the electric field at the first position a number of times, and wherein the oversampling is used determine a repetitive run-out component of the object, and the repetitive run-out component is removed from the measurements to determine a non-repetitive run-out component of the object. For example, in FIG. 3A, measurements of the electric may be taken a number of times while the electric field has maintained the same position. Further, measurements of the electric may be taken each time the electric field has completed multiple revolutions. In FIG. 5, the integrator and sigma-delta converter may be used to integrate and store the measurements to determine a repetitive and non-repetitive run-out component of the object.

In a block 610, the calculated first position of the object is stored 610.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
   a first plurality of electrodes disposed to form a first ring comprising a first diameter, and further operable to form an electric field around an object;
   a second plurality of electrodes alternately disposed with said first plurality of electrodes within said first ring, and further operable to measure variations in said electric field attributed to a position of said object;
   a third plurality of electrodes disposed to form a second ring comprising a second diameter greater than said first diameter, and further electrically coupled with an electrical ground; and
   a plurality of floating traces disposed on a floating trace plane, and wherein each of said second plurality of electrodes is coupled with at least one floating trace.

2. The apparatus of claim 1 further comprising a plurality of biasing circuits operable to bias said first plurality of electrodes to a plurality of voltage levels, wherein each of said biasing circuits are coupled with at least one of said first plurality of electrodes.

3. The apparatus of claim 1 wherein each of said second plurality of electrodes is electrically coupled with one another.

4. The apparatus of claim 1 wherein:
   said first plurality of electrodes equals said second plurality of electrodes in number; and
   said third plurality of electrodes equals the sum of the number of said first and second plurality of electrodes.

5. The apparatus of claim 1 further comprising a first sensing ring and a second sensing ring, wherein:
   said first and second sensing rings are circular with a third diameter greater than said second diameter;
   said first sensing ring is disposed on a plane above said floating trace plane and above at least one floating trace; and
   said second sensing ring is disposed on a plane below said floating trace plane and below at least one floating trace.

6. The apparatus of claim 1 wherein said first and second plurality of electrodes are disposed in vias formed in a printed circuit board.

7. An apparatus comprising:
   a plurality of biasing electrodes disposed to form a first ring, and further operable to generate and rotate an electric field surrounding an object;
   a plurality of floating electrodes disposed within said first ring, and further operable to measure variations in said electric field caused by a position of said object to determine said position; and
   a plurality of grounding electrodes disposed to form a second ring, and further electrically coupled with an electrical ground.

8. The apparatus of claim 7 wherein:
   each of the plurality of biasing electrodes is disposed between adjacent floating electrodes; and
   each of the plurality of floating electrodes is disposed between adjacent biasing electrodes.

9. The apparatus of claim 7 wherein each of said plurality of grounding electrodes is approximately equidistant from an adjacent biasing electrode and an adjacent grounding electrode.

10. The apparatus of claim 7 further comprising a plurality of biasing circuits, wherein each of said plurality of biasing electrodes is coupled with one of said plurality of biasing circuits.

11. The apparatus of claim 7 further comprising a plurality of floating traces, wherein:
    said plurality of floating traces is disposed on a floating trace plane; and
    each of said plurality of floating electrodes is coupled with at least one of said plurality of floating traces.

12. The apparatus of claim 11 further comprising a first sensing ring and a second sensing ring, wherein:
    said first and second sensing rings are circular;
    said first sensing ring is disposed on a plane above said floating trace plane and above at least one of said plurality of floating traces; and
    said second sensing ring is disposed on a plane below said floating trace plane and below at least one of said plurality of floating traces.

13. An apparatus comprising:
    a means for forming an electric field comprising a positively charged region and a negatively charged region;
    a means for rotating said electric field around an object at a first position, wherein said rotating revolves said positively charged region and said negatively charged region around said object through a first plurality of points, and
    a means for measuring said electric field at said first plurality of points around said object, wherein said means for measuring produces a first plurality of measurements measuring variations to said positively charged region and said negatively charged region, and wherein said means for measuring comprises measuring said electric field with a plurality of floating electrodes; and
    a means for calculating said first position of said object from said first plurality of measurements.

14. The apparatus of claim 13, wherein said first plurality of measurements is sampled around an approximately complete circumference of said object.

15. The apparatus of claim 13 further comprising:
    a means for measuring said electric field at a second plurality of points around said object at a second position, wherein said means for measuring said electric field at said second plurality of points produces a second plurality of measurements; and
    a means for calculating said second position from said second plurality of measurements.

16. The apparatus of claim 13 further comprising:
    a means for oversampling said electric field, wherein said means for oversampling comprises sampling measurements of said electric field at said first position a plurality of times, and wherein said means for oversampling is used to determine a repetitive run-out component of said object; and
    a means for removing said repetitive run-out component from said measurements to determine a non-repetitive run-out component of said object.

17. The apparatus of claim 13, wherein said means for forming an electric field comprises biasing a first half of a ring of a plurality of biasing electrodes to a positive voltage to form said positively charged region and biasing a second half of said ring of said plurality of biasing electrodes to a negative voltage to form said negatively charged region.

18. The apparatus of claim 13 wherein said means for rotating comprises time altering a distribution of a plurality of electric charges on a plurality of biasing electrodes over said first plurality of points around said object.

* * * * *